(12) United States Patent
Mopur et al.

(10) Patent No.: US 11,481,665 B2
(45) Date of Patent: Oct. 25, 2022

(54) SYSTEMS AND METHODS FOR DETERMINING MACHINE LEARNING TRAINING APPROACHES BASED ON IDENTIFIED IMPACTS OF ONE OR MORE TYPES OF CONCEPT DRIFT

(71) Applicant: Hewlett Packard Enterprise Development LP, Houston, TX (US)

(72) Inventors: Satish Kumar Mopur, Bangalore (IN); Gregory S. Battas, Bangalore (IN); Gunalan Perumal Vijayan, Bangalore (IN); Krishnaprasad Lingadahalli Shastry, Bangalore (IN); Saikat Mukherjee, Bangalore (IN); Ashutosh Agrawal, Bangalore (IN); Sridhar Balachandriah, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 740 days.

(21) Appl. No.: 16/186,422

(22) Filed: Nov. 9, 2018

(65) Prior Publication Data
US 2020/0151619 A1     May 14, 2020

(51) Int. Cl.
*G06N 20/00* (2019.01)
*H04L 67/12* (2022.01)
*G06N 5/04* (2006.01)
*G06N 3/08* (2006.01)

(52) U.S. Cl.
CPC .............. *G06N 20/00* (2019.01); *G06N 3/08* (2013.01); *G06N 5/047* (2013.01); *H04L 67/12* (2013.01)

(58) Field of Classification Search
CPC .......... G06N 20/00; G06N 3/08; G06N 5/047; H04L 67/12
See application file for complete search history.

(56) References Cited

U.S. PATENT DOCUMENTS

| | | | |
|---|---|---|---|
| 9,547,828 | B2 | 1/2017 | Mermoud et al. |
| 9,563,854 | B2 | 2/2017 | Cruz Mota et al. |
| 10,956,132 | B1 | 3/2021 | Schneider et al. |
| 2007/0220034 | A1 | 9/2007 | Iyer et al. |
| 2017/0060574 | A1 | 3/2017 | Malladi et al. |

(Continued)

OTHER PUBLICATIONS

Accenture labs, "Find Your Edge, Bringing Analytics to Data at the Edge of IoT", (Research Paper), Retrieved on Jun. 4, 2018, 17 pages.

(Continued)

*Primary Examiner* — Joseph H Feild
*Assistant Examiner* — Rufus C Point
(74) *Attorney, Agent, or Firm* — Sheppard Mullin Richter & Hampton LLP

(57) ABSTRACT

A system and method for accounting for the impact of concept drift in selecting machine learning training methods to address the identified impact. Pattern recognition is performed on performance metrics of a deployed production model in an Internet-of-Things (IoT) environment to determine the impact that concept drift (data drift) has had on prediction performance. This concurrent analysis is utilized to select one or more approaches for training machine learning models, thereby accounting for the temporal dynamics of concept drift (and its subsequent impact on prediction performance) in a faster and more efficient manner.

11 Claims, 5 Drawing Sheets

(56) References Cited

U.S. PATENT DOCUMENTS

| | | | |
|---|---|---|---|
| 2017/0061329 A1* | 3/2017 | Kobayashi | G06N 20/00 |
| 2017/0063886 A1 | 3/2017 | Muddu et al. | |
| 2017/0330109 A1* | 11/2017 | Maughan | G06N 20/00 |
| 2018/0032908 A1 | 2/2018 | Nagaraju et al. | |
| 2018/0136617 A1 | 5/2018 | Xu et al. | |
| 2018/0219889 A1* | 8/2018 | Oliner | G06N 3/08 |
| 2020/0099709 A1 | 3/2020 | Vasseur et al. | |
| 2020/0405204 A1* | 12/2020 | Howard | A61B 5/14546 |
| 2021/0184958 A1* | 6/2021 | Kolar | H04L 43/14 |

OTHER PUBLICATIONS

Ajit Jaokar "The Evolution of IoT Edge Analytics: Strategies of Leading Players", (Research Paper), Sep. 2016, 13 pages.

Bhatia, R., "Edge Analytics-Taking Data Processing From Cloud to Edge of Network", (Research Paper), Feb. 15, 2017, 10 pages.

Deploy an Azure Machine Learning Model to an Azure Iot Edge Device, (Research Paper), Jan. 2, 2018, 3 Pgs.

Oyekanlu et al., Towards Statistical Machine Learning For Edge Analytics In Large Scale Networks: Real-Time Gaussian Function Generation with Generic DSP, (Research Paper), 2018, 1 page.

Rikard Konig, "Edge Analytics for IoT", (Research Paper), Retrieved on Jun. 4, 2018, 13 pages.

Change Happens: Adaptability of Machine Learning Models, (Research Paper), Jan. 4, 2018, 8 Pgs.

Jung et al., "Hypergraph-based overlay network model for the Internet of Things", 2015 IEEE 2nd World Forum on Internet of Things, 2015, 6 pages.

Qu et al., "A Hypergraph-Based Blockchain Model and Application in Internet of Things-Enabled Smart Homes", Sensors, 2018, 18 pages.

* cited by examiner

SYSTEMS AND METHODS FOR DETERMINING MACHINE LEARNING TRAINING APPROACHES BASED ON IDENTIFIED IMPACTS OF ONE OR MORE TYPES OF CONCEPT DRIFT

DESCRIPTION OF RELATED ART

In an Internet-of-Things ("IoT") environment there are can be a large number of sensors often located far from the IoT core (e.g., data center, the cloud), generally referred to as the IoT edge. Because of the large number of sensors each sensing/reporting information, an enormous volume of data (e.g., sensor readings) is created, the data being invaluable to data analytics. With the enormous amount of sensors and data comes an enormous amount of dataflow paths (e.g., tens to thousands) across the entire IoT environment, generally with a constant addition of new endpoints and associated dataflow paths. This streaming data is valuable for various data analytics and predictive modelling to monitor performance of the IoT edge environment.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Edge computing involves pushing data processing functions within an IoT environment from the IoT "core" (e.g., data center, cloud-based system, etc.) closer to the source of the data located at the IoT "edge." The IoT edge refers to locations of data generation and associated real-time data processing. The IoT edge could be a factory floor, a residence, or other locations with connected devices, or even the connected devices themselves. The goal of edge computing is to ensure that data which a device needs to process quickly is processed near the device, reducing latency. Processing applications can be pushed out to the IoT edge, leaving the more data-intensive and heavily analytical applications for the IoT core to handle, making more efficient use of available resources. For example, machine learning ("ML") algorithms (or models) may be deployed by the IoT core to devices at the IoT edge to enable the IoT edge to perform certain actions to maintain optimal conditions, while the IoT core can receive the same data and perform more intensive data analytics to ensure that the IoT edge is working at its optimal condition.

Embodiments of the technology disclosed herein aims to address inefficiencies caused by the transient nature of data streams by identifying the impact of such changes within an IoT environment and utilizing such information to determine how to train ML models to rapidly and efficiently optimize ML model performance at the IoT edge. This changing nature of inputs is known in predictive analytics as "concept drift" (explained in greater detail below), which means that the statistical properties of a target variable (e.g., an optimal climate within a room) that a predictive model is trying to predict can change over time in unforeseen ways, reducing the efficiency of deployed ML models at the IoT edge. Unlike current approaches that merely compares the performance of various ML models (both the deployed (production) model and other potential ML models) based on new data, embodiments in accordance with the present disclosure considers the impact such drift has on the deployed model to determine how best to approach training the ML models to more efficiently and quickly identify the need to deploy a new ML model to the IoT edge. As part of continuously learning at the IoT core from data streams from the IoT edge, the nature of drift occurring within the IoT edge is recognized through pattern recognition of prediction data and considered in the determination of how to train ML models under training. Embodiments of the technology of the present disclosure are not merely concept drift data detectors, but track the performance metrics owing to the concept drift, thereby enabling more precision in the modelling process through a concurrent approach.

Figure 1:
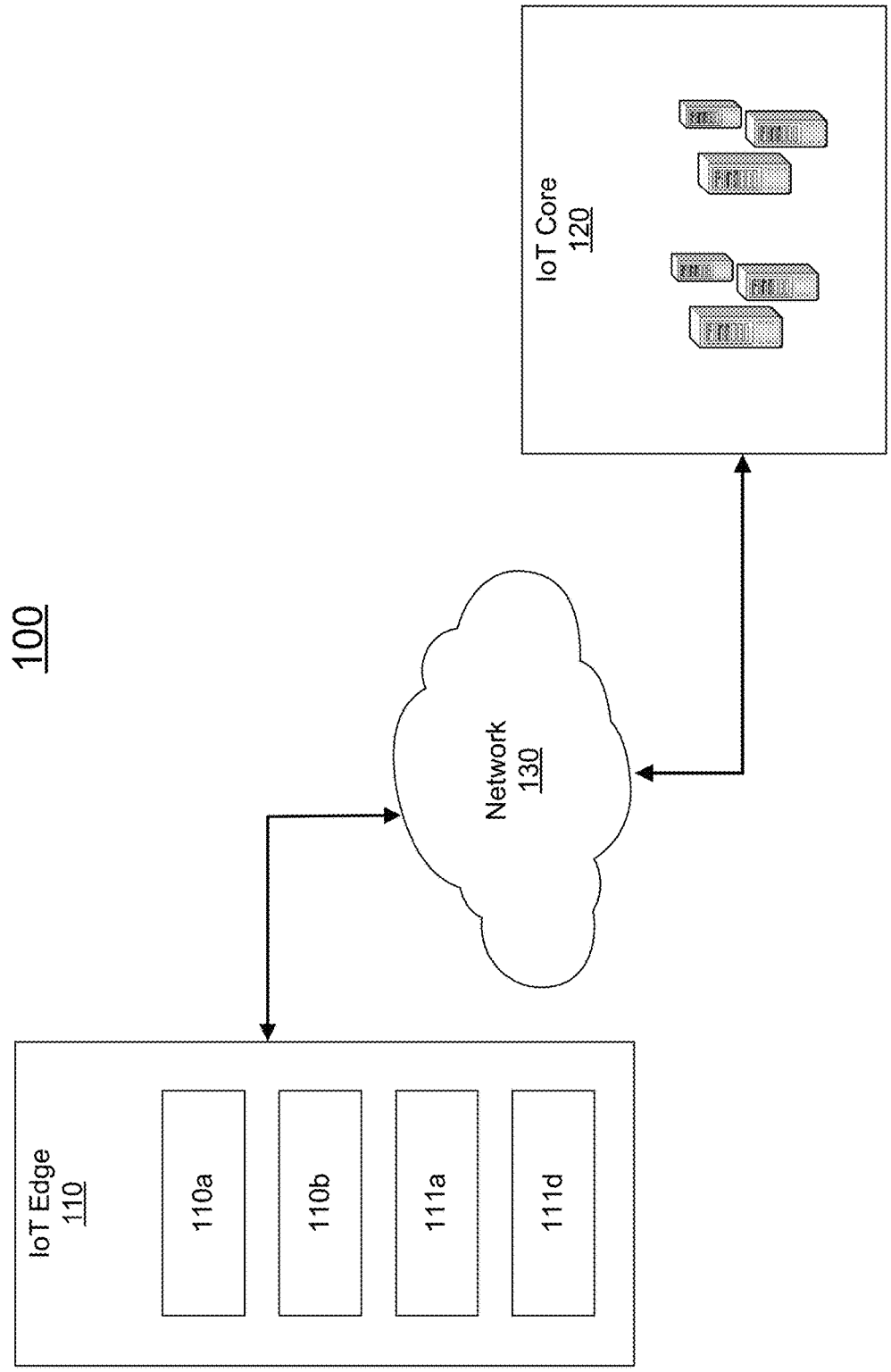
FIG. 1 illustrates an example IoT environment in which embodiments of the technology disclosed herein can be implemented.

FIG. 1 illustrates an example IoT environment 100 in which embodiments of the technology disclosed herein can be implemented. Although various components are described, it would be understood by a person of ordinary skill in the art that other components may be present in various embodiments, and that nothing in this disclosure would be interpreted as limiting the IoT environment applicable with the technology disclosed herein solely to the components described herein. As illustrated in FIG. 1, the IoT environment 100 can be divided into at least two domains, the IoT edge 110 and the IoT core 120, connected over a network 130. Network 130 may be a wireless (for example, cellular) network, a wired network, and/or a hybrid network. Network 130 may include, for example, a Local Area Network ("LAN"), a Wireless Local Area Network ("WAN"), a Metropolitan Area Network ("MAN"), a Storage Area Network ("SAN"), a Campus Area Network ("CAN"), or the like. Further, network 130 may be a public network (i.e., the Internet) or a private network (e.g., an intranet).

For ease of discussion, a single instance of IoT edge 110 is depicted. As discussed above, the "edge" of the IoT environment may generally refer to the location apart from the IoT core where data within the system is generated/collected. An IoT edge comprises a plurality of sensors, collecting a variety of different types of data, and computing edge devices, such as gateways or edge servers for data capture from the sensors. The compute environment at the IoT edge performs data collection, pre-processing such as data cleansing, and real-time analytics. A person of ordinary skill in the art would understand IoT environment 100 can include a plurality of instances of IoT edge 110. In some implementations, the multiple instances of IoT edge 110 may be co-located within a building (e.g., a factory), with each instance associated with different IoT devices. In other implementations, one or more instances of IoT edge 110 may represent different geographic locations comprising a plurality of IoT devices, which are all connected to the IoT core 120 of IoT environment 100.

The types of end user devices included may vary, depending on the particular implementation of the IoT environment 100. For example, in the manufacturing field, an IoT edge 110 may represent a factory floor comprising a number of industrial machines such as rollers, stampers, conveyor belts, pneumatic lifts, and other machinery, which may be manually operated or robotically controlled. In other examples, the IoT edge 110 may represent a residential home with a variety of connected devices, such as refrigerators, washers and dryers, air conditioning units and heating systems, security systems, and automated devices (e.g., robotic cleaning machines), among other devices. Regardless of the context/environment, all of these different devices at IoT edge 110 can provide streams of data to the IoT core 120 over network 130 concerning its operation, such as state information. In addition, many of these devices may include a variety of sensors that detect additional information, which is also streamed back to the IoT core 120. In various embodiments, IoT edge 110 can include additional sensors (not included in other devices) to collect and stream data back to IoT core 120 over the network 130.

In various embodiments, each instance of IoT edge 110 comprises a plurality of different end user devices. For example, IoT edge 110 may include a plurality of sensors 110a, 110b configured to collect various types of data. In various embodiments, sensors may be attached to or included within other devices, such as robots or other automated devices as non-limiting examples. Some embodiments may include stand-alone sensors, unassociated with any particular device or entity within IoT edge 110, but configured to collect one or more types of data.

IoT edge 110 may include computing edge devices 111a, 111b, such as the computing edge devices discussed above. Computing edge devices 111a, 111b collect the various streams of data collected by the sensors 110a, 110b within IoT edge 110, and may perform real-time analytics or other functions discussed above. For example, IoT edge 110 may include an edge server running one or more data processing and analytics applications. One example of such data processing and ML analytics inference may include predictive analytics of sensors data from machines in factories to monitors such as vibration, temperature for potential anomalies and predictive maintenance. Another example may by for security surveillance through classification analytics on captured images from cameras and other sensors within the IoT edge 110 to track multiple objects and people. As discussed in greater detail below, embodiments of the technology disclosed herein assess the performance of the ML models deployed to perform such predictive analytics to ensure consistency of the predictions.

The IoT sensors 110a, 110b, and computing edge devices 111a, 111b may use wired and/or wireless communication technologies to transmit data, including but not limited to: radio frequency identification ("RFID"); near-field communication ("NFC"); optical tags; Bluetooth; ZigBee; Thread; cellular communication standards (e.g., LTE); and WiFi; among others.

The IoT core 120, a high-end compute and store environment, may refer to the administrative entity within the IoT environment 100. In various embodiments, IoT core 120 may be a data center, while in other embodiments IoT core 120 may be a cloud implementation. In still other embodiments, a combination of a data center and cloud may be used to perform the functions of IoT core 120 as described herein. IoT core 120 handles the majority of complex data analytics for the IoT environment 100, including training of ML models for the data analytics requirements used at the IoT edge 110. The IoT devices (such as, 110a, 110b, 111a, 111b) produce an enormous amount of data at IoT edge 110 that is streamed back to the IoT core 120 by computing edge devices (like an edge server) over network 130. IoT core 120 runs a variety of data analytics using ML on the incoming data streams from the IoT endpoints (i.e., computing edge devices 111a, 111b discussed with respect to FIG. 1) and characterize the data, monitor the performance metrics of the ML techniques as prediction or classification accuracy (e.g., recall, precision), to determine whether revisions are necessary to the ML models at the IoT edge 110. In some embodiments, the ML performance metrics analysis performed may be wholly automated, while in others data expert may review the data after processing to determine how to classify information and what types of revisions may need to be made to the ML models. Examples of some of the types of ML model performance metrics at the IoT core 120 include confusion (or error) matrix analysis, applying receiver operating characteristic (ROC) curves, root mean square error (RMSE) or root mean square deviation (RMSD), among others. By offloading some of the more time-sensitive data processing to the IoT edge 110, IoT core 120 can focus on more rigorous analytics that may take more time than would be desirable for low-latency metrics.

With respect to the ML models deployed at each instance of IoT edge 110, the IoT core 120 automatically or with input from a data expert can select certain supervised learning categories (e.g., deep learning neural nets for classification or regression depending on the data type and use cases), build and fit ML models by subjecting each model to a training data set, qualify performance by applying a validation data set (to obtain unbiased results), and create a reasonably generalized ML model. Moreover, parameters of the ML models can be tuned at the IoT core 120 based on the reasonably generalized model prior to deployment to the IoT edge 110.

However, often the data streams in an IoT environment (such as IoT environment 100) can shift and evolve in their patterns, presenting challenges to predictive modelling (such as machine learning). The number of and amount of data within data streams may change within each instance of IoT edge 110. New IoT devices may be added to (or removed from) an instance of IoT edge 110. As such, the ML model running as an application at the IoT edge 110 may degrade in performance because that ML model was trained on a different set of training data before being deployed. That is, the addition (or subtraction) of new data streams, or pattern variation in the current data streams, may impact the relationship between other data streams and the target variable (the dependent variable which each ML model is seeking to optimize). The change in data streams may require a revision to the ML model running at the IoT edge 110, or an entirely new ML model to be deployed.

This lack of consistency in the data streams subjects IoT environments (like IoT environment 100) to a concept in predictive modelling known as "concept drift" (sometimes referred to as "covariate shift," "dataset shift," or "nonstationarity"). Machine learning and other types of predictive modelling seek to identify patterns and relationships between input and output data to develop algorithms for processing data. As data streams evolve over time, so to do the relationships between data streams and a target variable, rendering the ML model deployed at the IoT edge 110 obsolete. Concept drift refers to the unforeseen change in these relationships over time. For example, there may be a gradual change in the data over time. Other changes may be recurring or cyclical. Still other times the change may be abrupt and sudden, and occur in a random manner. This is acutely relevant for ML techniques such as artificial neural networks, and other types of machine learning subsets commonly referred to as deep learning, which aim to solve problems in a method similar to the human brain. The impact of these different types of drift may indicate the need for a different approach to training and choosing ML models to address, for example by selecting different data sets to use in training.

Current approaches to dealing with concept drift and changes in data streams in IoT environments fails to take into account the impact of types of concept drift in determining how to train ML models for determining how best to address the changing environment. One current method utilizes batch learning, whereby large data sets comprising data from IoT devices are collected and these large data sets are processed at once. Such batch learning is time consuming and also computational- and memory-intensive, making such training methods ill-suited for ensuring fast updating of ML models operating at IoT edges, resulting in less than optimal performance of IoT edge devices for longer periods. Another approach is incremental learning, where new data received from IoT devices is used to verify performance of ML models, whether on a set schedule or on demand. However, incremental learning focuses on only new data from devices to determine whether the ML model is performing properly.

These current approaches, however, fail to consider the impact of specific types of drift occurring within the system in determining how to train ML models to address changes, injecting inefficiency into the ML model training process. Simply applying the same types of data to train ML models, including newer data, in a continuous manner does not account for potential patterns in the types of drift occurring. For example, a similar recurrent pattern of change in the data streams may be present in the IoT edge, recurring for several different types of data streams. In such situations, prior solutions would simply perform the same type of training approach used to address any change in relationships. Embodiments of the technology disclosed herein not only performs the type of continuous ML model training as in the prior art, but also analysis the pattern of the performance metrics themselves. That is, concurrently with the continuous ML model training, embodiments of the technology disclosed herein analyzes and identifies the impact of data drift on the different performance metrics being used, providing an assessment of how much performance error exits in the IoT edge, not simply that performance error exists (as in the prior art). Including this additional level of analysis (i.e., considering the impact of concept drift in addition to continuous training like that disclosed in the prior art) speeds up determining the optimal ML model to deploy to the IoT edge.

Figure 2:
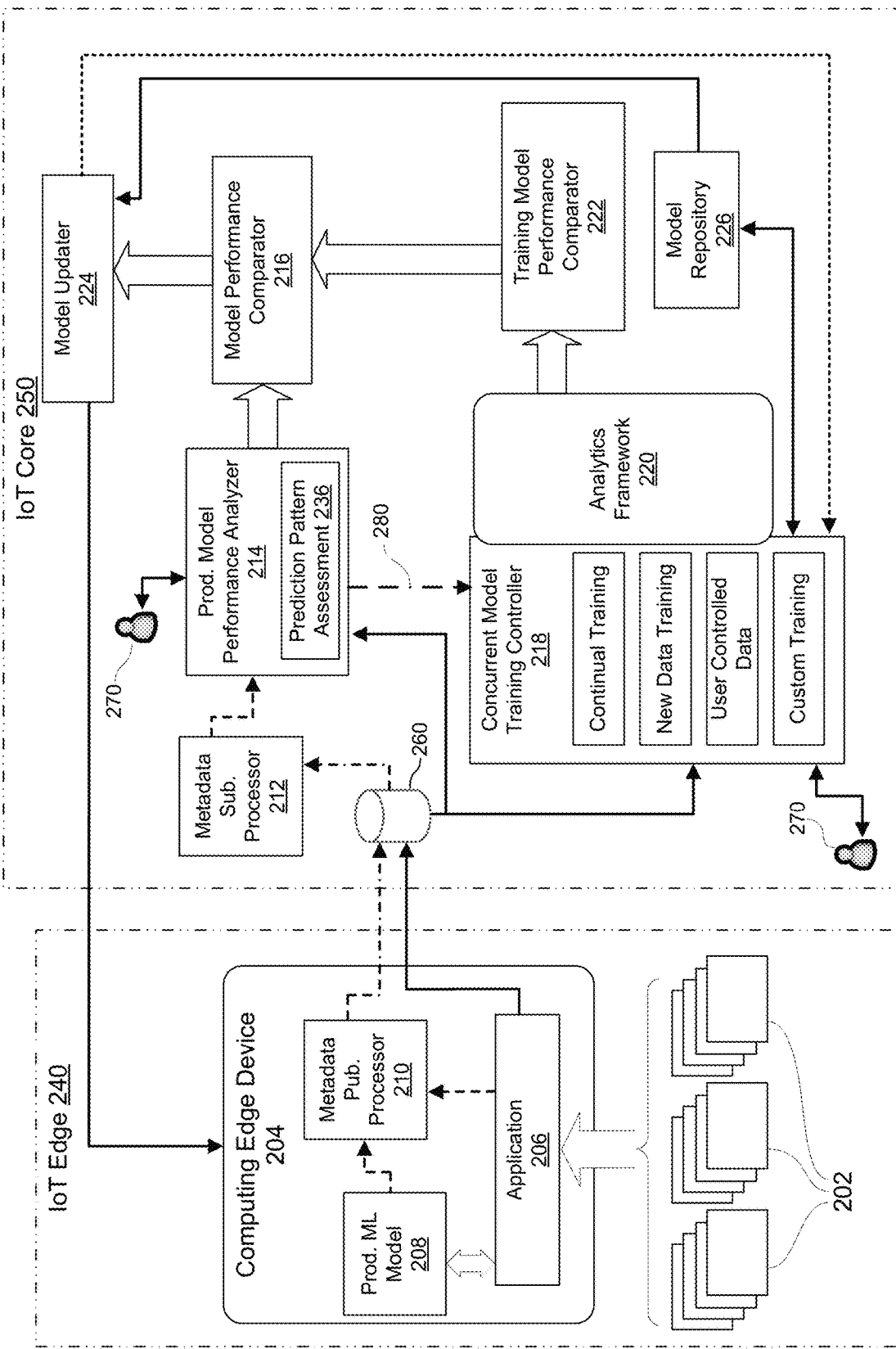
FIG. 2 illustrates an example intelligent model updating system in accordance with various embodiments of the technology disclosed herein.

FIG. 2 illustrates an example intelligent model updating system 200 in accordance with various embodiments of the technology disclosed herein. The intelligent model updating system 200 can be implemented within an IoT environment, such as IoT environment 100 discussed with respect to FIG. 1. As would be appreciated by one of ordinary skill in the art, embodiments of the technology disclosed herein are applicable for improving existing IoT environments, as well as being incorporated into new IoT environments.

Referring again to FIG. 2, it is assumed that an initial production ML model has been deployed by IoT core 250 to the IoT edge 240. In various embodiments, the initial production ML model is deployed to the IoT edge 240 by the model updater 224. The generation of the initial production ML model can be done using known initialization techniques. In addition to deploying the initial production ML model to the IoT edge 240, the model updater 224 also sends the initial production ML model to the concurrent model training controller 218, as shown in FIG. 2. As will be explained in greater detail below, by providing the currently deployed production ML model to the concurrent model training controller 218 embodiments of the technology disclosed herein enable concurrent training of the ML model version deployed in production along with other ML models under training. The various embodiments shall be discussed assuming an initial production ML model has already been deployed to IoT edge 240.

The intelligent model updating system 200 includes an IoT edge 240 comprising a plurality of sensors 202. Sensors 202 may include any device configured to collect data and send such collected data to through a data stream to a computing edge device 204. In various embodiments, sensors 202 may be stand-alone devices, devices incorporated within other connected devices (e.g., robots, forklifts, air conditioning units, refrigerators, etc.), or a combination of both. Computing edge device 204 may be any edge computing device configured to execute one or more applications 206 and production ML models 208 (to perform data analytics at the IoT edge). For ease of discussion, a single application 206 and production ML model 208 is illustrated in FIG. 2; a person of ordinary skill in the art would appreciate that computing edge device 204 can run a plurality of applications 206 and production ML models 208.

Application 206 consumes production ML model 208 to perform analytics of the various data streams from sensors 202. Production ML model 208 performs various analytics based on the training of the production ML model 208 to monitor a particular target variable within the IoT edge 240. For example, maintaining an optimal climate within a building may be a target variable of the intelligent ML model updating system 200. Application 206 may be configured to receive data streams from sensors detecting atmospheric conditions (e.g., humidity from moisture sensors in the building, temperature readings from temperature sensors, operational conditions of air conditioning units within the building, etc.). Production ML model 208 takes the data received as inputs and determines whether the outputs match a predicted outputs indicative of an optimal climate. For example, where the outputs do not match the predicted outputs, application 206 may send commands to control devices within the building to remedy the situation (e.g., change the setting of a dehumidifier if the humidity exceeds optimal levels, put down the temperature of the air conditioning unit, etc.).

Intelligent ML model updating system 200 also includes a metadata publishing processor 210 in the computing edge device 204. In various embodiments, metadata associated with the deployed machine learning module may be created by production ML model 208, application 206, or a combination of both. Metadata publishing processor 210 is configured to package the metadata from production ML model 208 and/or application 206 into aggregated model metadata for transmission to the IoT core 250. The aggregated model metadata represents the state of production ML model 208 in various embodiments at a given time, such that recreation of the state is possible for purposes of assessing performance. In various embodiments, the aggregated model metadata may include, but is not limited to: prediction requests; outputs corresponding to prediction request; timestamps; prediction latency; ML model version; edge device identification; among others. In addition to the aggregated model metadata, the sensor data received by application 206 from sensors 202 is transmitted to IoT core 205. In various embodiments, metadata publishing processor 210 may be a processor configured to execute data processing functions using a flow orchestration software that is capable of sending the data to an IoT core over the network.

In various embodiments, the transmitted data may be received and stored in a server database 260 at the IoT core 250. The data may be transmitted across a network connection, such as network 130 discussed above with respect to FIG. 1. In various embodiments, the transmitted data (i.e., the aggregated model metadata and sensor data) can be saved as historical data for future use in comparison and training of ML models. Server database 260 may be a distributed storage system, a local storage system, or a cloud-based storage system, among others.

In various embodiments, metadata subscribing processor 212 retrieves the aggregated model metadata from server database 260 and unpackages the aggregated model metadata. Unpackaging the aggregated model metadata may entail, in various embodiments, parsing the various types of metadata included within the aggregated model metadata. After unpacking the aggregated model metadata, metadata subscribing processor 212 feeds the unpackaged metadata into the production model performance analyzer 214.

Production model performance analyzer 214 analyzes the performance of the production ML model 208 deployed in the computing edge device 204 through assessment of the deployed ML model performance metrics. In various embodiments, production model performance analyzer 214 recreates the production ML model 208 utilizing the unpackaged metadata provided by metadata subscribing processor 212. To determine the performance of production ML model 208 at the computing edge device 204, production model performance analyzer 214 compares prediction data from the unpackaged metadata with real values from the actual sensor data retrieved from server database 260. Various different types of performance metrics assessment processing may be implemented within production model performance analyzer 214. For example, a RMSE module may be implemented for performance analysis of time series prediction models, y comparing the predicted results from recreating the state from the unpackaged metadata against the actual sensor data received. As another example, a ROC curve analysis model may be used to evaluate performance of classification models. A person of ordinary skill in the art would appreciate the different types of performance metrics assessment which may be implemented with production model performance analyzer 214 to analyze the performance of the production model. In some embodiments, a user 207 (e.g., a data expert, IoT administrator, etc.) may implement custom performance assessment modules associated to specific user models (e.g., a custom performance assessment module monitoring only False Positives or only False Negatives). In various embodiments, the user 270 may review the results of the comparison, to monitor the results and identify any additional comparisons that could be performed.

As discussed above, the impact of data drift in term of patterns in performance metrics provides valuable insight into how to efficiently and quickly address such drift through the training process. By feeding the results of the various performance analyses within production model performance analyzer 214 into a prediction pattern assessment module 236, embodiments of the technology of the present disclosure is capable of determining the impact of the drift. The prediction pattern assessment module 236 analyzes the pattern of the performance metrics. For example, a user may extract a performance metric values sequence from the results of 214, such as precision with a specific length that are above a desired threshold, and using such extracted sequence as a baseline.

The prediction pattern assessment module 236 of production model performance analyzer 214 can implement a variety of pattern recognition algorithms to identify the impact of data drift on the production ML model 208. A person of ordinary skill in the art would appreciate that the technology disclosed herein is applicable with any method of pattern recognition. For example, in various embodiments the prediction pattern assessment module 236 may be an autocorrelation based assessment function against a sequence of baseline performance metrics expected by a user (e.g., a party managing the IoT environment, a data expert, etc.). For example, a user may extract a performance metric values sequence from the results of 214, such as precision with a specific length that are above a desired threshold, and using such extracted sequence as a baseline. In other embodiments, the length and start time stamp of the sequence of values for correlation can be tuned by production model performance analyzer 214, based on pre-defined requirements. The cross-correlation assessment function performs correlation of each set of precision values in a continuous manner from the results of production model performance analyzer 214 against the baselined sequence. The pattern assessment results may be interpreted as follows:

Pattern of high positive correlation (e.g., 0.75 to 1) may imply less variation in the model predictions (i.e., low impact of data drift);
Pattern of mixed positive and negative correlation may imply a recurring nature of good and bad predictions;
Pattern of negative or low correlation may imply consistent bad predictions (i.e., degrading performance due to data drift).

The example specific numerical values identified above are tunable based on the tolerances of a particular implementation, and may be tuned either manually by a data expert or by one or more components of the IoT core 250 (e.g., production model performance analyzer 214, concurrent model training controller 218, etc.). A person of ordinary skill in the art would understand and appreciate that these are three common scenarios that occurs within IoT environments. The impact of data drift in other scenarios may also be identified through implementing embodiments of the present disclosure, based on the method of interpretation implemented in the IoT environment.

Following pattern recognition, production model performance analyzer 214 provides the performance statistics to model performance comparator 216. In some embodiments, the performance statistics could be the raw correlation data identified by the prediction assessment module of production model performance analyzer 214. In various embodiments, model performance comparator 216 performs a comparison of the performance statistics from the production model performance analyzer (representing the performance of the deployed production ML model 208) against the performance statistics of the continually under training models output by the training model performance comparator 222 (discussed further below). Based on this comparison of statistics (informed by the identified impact of data drift, as discussed in greater detail below), model performance comparator 216 determines which analyzed model is best. In various embodiments, the comparison process is based on a consumer's requirements for model performance within the intelligent ML model updating system 200. Such requirements are typically thresholds based on which a model is chosen for subsequent deployment to computing edge device 204. For example, a customer's requirement for a classification model selection may be: if<a performance metric such as Recall of Model v2 is highest in a ranked order> and <performance metric Precision is above a specified threshold> and <Latency is within a specified threshold> deploy Model v2. In this example, "Model v2" represents a ML model trained with a custom data set selected either by a data expert 270 or the concurrent model training controller 218, based on the impact of data drift 280.

In addition to outputting performance statistics to the model performance comparator 216, in various embodiments of the technology disclosed herein the production model performance analyzer 214 provides the identified impact of the data drift 280 to concurrent model training controller 218 for use in determining how best to train the machine learning models (the production ML model 208 as deployed, different ML models, or a combination of both) to address the data drift impact. As illustrated in FIG. 2, the identified drift impact 280 may be transmitted to the concurrent model training controller 218. Utilizing the identified drift impact 280, the concurrent model training controller 218 can select the type of training to be conducted by analytics framework 220 to address the drift, based on user choices of models or automatically based on the received information. Concurrent model training controller 218 is communicatively coupled with model updater 224 (discussed in greater detail below) to fetch the ML model version deployed at the IoT edge 240 from a model repository 226. In this way, concurrent model training controller 218 is capable of performing continual training of the production ML model deployed at any given time, in addition to training using various data sets and/or different versions of the ML model deployed.

Concurrent model training controller 218 provides various options for continually training ML models, concurrently with the prediction model assessment discussed above (which is accounted for in determining one or more training options/approaches). In various embodiments, examples of the type of training approaches that may be selected based on the sensor data from the IoT edge 240 and (concurrently) the identified impact of data drift discussed above may be as follows (assuming that the initially deployed production ML model 208 is v1.A):

Continual training—A model version (e.g., v1.8) for continuous training on streaming data (both new and historic data);

New data training—A model version (e.g., v1.C) for training only on new streaming data from the currently deployed (i.e., v1.A) at a given time;

User controlled data—The production model version (i.e., v1.A) on which a user might want to perform additional prediction queries;

Custom training—A new model (e.g., Model 2) for training by a custom data set defined by the user (which may include selecting data based on time stamps from an historical database). For example, the data set may be oscillatory/non-stationary data over a time period. In various embodiments, the historical database may be server database 260, while a separate historical database (not pictured) may be used in other embodiments.

For ease of understanding, a more detailed discussion of these example training approach options is provided. For example, concurrent model training controller 218 may determine to choose continual training, whereby the deployed version of the production ML model 208 is trained on accumulated streaming data from the computing edge device 204. In such a training mode, the data set includes not only the new streaming data but also historical data previously used to train the production ML model 208. Such training may be selected, in some embodiments, to address gradual change in performance caused by data drift (i.e., a consistent high positive correlations values in the example algorithm discussed above) because the data drift does not appear to be having a strong impact on the production ML model's 208 performance. This would result in a new version of the production ML model (production ML model 208.1).

Other impacts may indicate the need to perform new data training. For example, in some embodiments a sequence of negative or low correlation values may indicate that the drift has resulted in a drastic change in performance. In such cases, utilizing only new streaming data may be preferable, as the historical data has consistently resulted in poor predicted performance. Accordingly, training may be performed on the first production ML model 208 as deployed may be trained only with new streaming data to try and achieve a faster improvement in performance. This would result in a new version of the production ML model (production ML model 208.2).

Another form of training the impact of data drift may indicate the need to add additional prediction metrics to the original training regime. For example, in an image classification scenario, a classification done by the production model version (i.e., v1.A) may be with low confidence and be erroneous. The result could be manually inspected by a user (i.e., data expert) and manually reclassifies the image. This new classification data is therein used to train the model. This type of user controlled training would apply additional prediction metrics to the original production ML model 208 in an attempt to identify the unknown relationships impacting performance In various embodiments, more than one user controlled training can be launched.

In some embodiments, it may be preferable to utilize a custom data set in training the model. This custom training may be used where there is a sequence of both high positive and negative correlation values, indicating a recurring nature in the impact of data drift. The custom training mode may utilize the time stamps of various data to allow for specific periods of data to be used to train the production ML model 208 to be able to identify the data drift-caused recurring change, resulting in another version of the production ML model 208 (production ML model 208.3). The user may tune the algorithm, for example a neural network learning rate for further optimization.

This is a continuous process. For example, initially only v.1.B is deployed at IoT core for continuous learning. This can be augmented with V1.C, and later v1.A in parallel as the data drift impact is detected. All three can continue to run in parallel, since data drift may correct itself or persist, depending on the IoT ecosystem, to support the user in obtaining at least one optimized model under multiple drift scenarios.

Other types of training modes may also be utilized to address the impact of data drift. In some embodiments, one or more of the training modes discussed above may be performed by the concurrent model training controller 218 to address the impact of data drift. In some embodiments, the concurrent model training controller 218 may include computing logic to determine which types of training modes to employ based on the impact of the data drift, while in other embodiments the determination may be made by a data expert or other external entity that has access to the identified data drift impact. In some embodiments, a combination of both may be employed.

By implementing the concurrent model training of the embodiments of the technology disclosed herein, updates to ML models deployed to the IoT edge 240 can be made faster and with greater efficiency compared to prior art solutions. Previously, although continual training of a model was possible through a variety of methods, the prior art failed to concurrently analyze the performance metrics to identify the impact of data drift, thereby allowing for such impact to be accounted for in determining how to train the models. Owing to the temporal dynamics of concept (data) drift and its subsequent impact on prediction, the technology of the present disclosure functions as a closed loop system with the model performance comparator 216 ensuring a continuous pipeline of optimized models. Identification of the impact of concept drift in the prior art could not be considered in a timely fashion, thereby resulting in a lack of a continuous pipeline of temporally optimal models (i.e., models based on examining performance metrics/performance deviation in an automated manner). Moreover, the concurrent model training controller 218 in conjunction with the pattern assessment of the production model performance analyzer 214 enables parallel training of different model types, using different types of training data. As a result, it is possible to see which model optimal performs without the need for manually observing data drift and taking decision on model fit based on a manual assessment, which can be prone to human error and is time consuming.

Analytics framework 220 performs the training of the models based on the chosen training modes and training data sets. Analytics framework 220 may employ any known training applications.

Following training, analytics framework 220 outputs the performance statistics of the different training modes selected to the training model performance comparator 222. In various embodiments, training model performance comparator 222 may compare the statistics from the different training modes and select only the best performing model to provide to the model performance comparator 216. In other embodiments, training model performance comparator 222 may identify those training models that match a certain threshold of performance for particular predicted outputs. In such embodiments, model performance comparator 216 may receive multiple trained ML models from training model performance comparator 222. The thresholds utilized by training model performance comparator 222 may be the same as the thresholds discussed above with respect to the model performance comparator 216.

Concurrent model training controller 218 may also output the under training models to a model repository 226. After determining the best machine learning model to address the impact of data drift, model performance comparator 216 outputs the selected model identity to model updater 224. Model updater 224 dynamically deploys the chosen model version from model repository 226 to the computing edge device 204 in the IoT edge 240. In addition, model updater 224 also communicates the chosen model to the concurrent model training controller 218 post deployment to the computing edge device 204. In various embodiments, model updater 224 includes timestamp information with the chosen model communicated to the concurrent model training controller 218, enabling continuous training of deployed ML models.

Where user or external entity input is discussed, a person of ordinary skill in the art would appreciate that an interface is present in the intelligent ML model updating system 200 to facilitate interaction with the components of the IoT core 250 discussed above.

Although discussed as separate components, one or more of the entities discussed with respect to FIG. 2 may be combined into a single component. For example, metadata subscriber processor 212 and production model performance analyzer 214 may be a single component (i.e., a single processor configured to execute the functions of metadata subscriber processor 212 and production model performance analyzer 214). A person of ordinary skill in the art would know how to combine the various components of the intelligent ML model updating system 200.

Unlike current approaches to addressing concept drift by analyzing the actual sensor data and merely focuses on performing the same type of training used for development of the initial deployed model, embodiments of the present disclosure take into account the impact of such concept drift as reflected by ML performance metrics to streamline the updating process, allowing more intelligent training approaches to be implemented to achieve faster and more efficient updating of deployed ML models.

Figure 3:
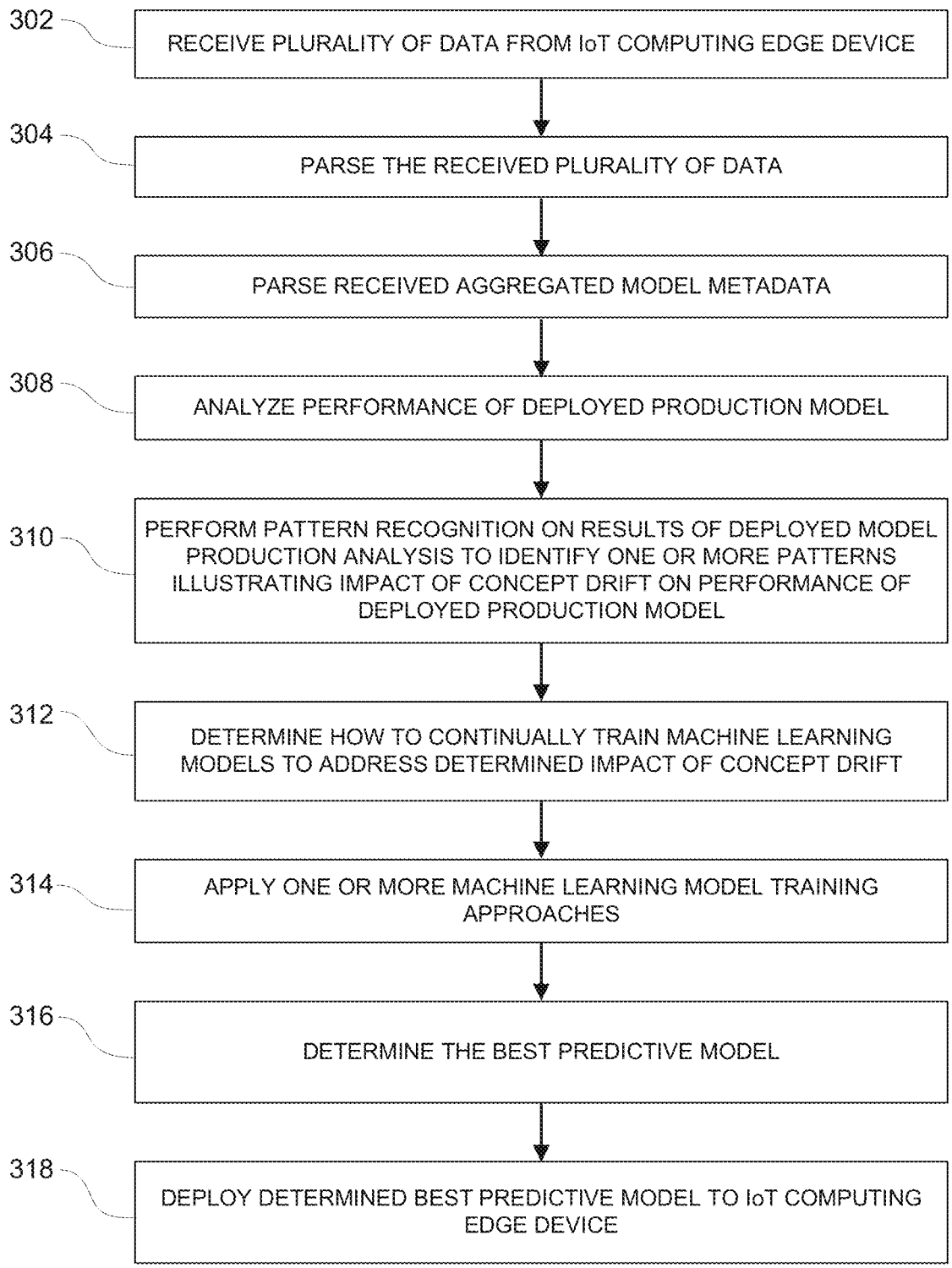
FIG. 3 illustrates an example method in accordance with various embodiments of the technology disclosed herein.

FIG. 3 illustrates an example method 300 in accordance with various embodiments of the technology disclosed herein. The example method 300 may be performed by a computing device at an IoT core, such as the IoT core 120 or IoT core 250 discussed with respect to FIGS. 1 and 2, respectfully. At operation 302, a plurality of data from an IoT computing edge device is received. An IoT computing edge device may be any IoT device in the edge configured to serve as a gateway or endpoint, communicatively coupled with the IoT core through a network and designed to aggregate data streams from various sensors within the IoT edge. In various embodiments, the IoT computing edge device may be an edge server including a processor and logic for monitoring performance of various device at the IoT edge and to perform data analytics on the collected sensor data.

In various embodiments, the plurality of data may include data streams from one or more sensors connected to the IoT computing edge device. Aggregated model metadata associated with a deployed production ML model of the IoT computing edge device may be included in the plurality of data in some embodiments, similar to the aggregated model metadata discussed above with respect to FIG. 2. The plurality of data can be received over a network connection between the IoT core (were method 300 is performed) and the IoT computing edge device, such as network 130 discussed above with respect to FIG. 1.

At operation 304, the plurality of received data is parsed. In various embodiments, parsing the received data can comprise identifying a type of data received. For example, parsing the received data can include categorizing the data as either sensor data or aggregated model metadata, as described with respect to FIG. 2. In various embodiments, the parsing of the received plurality of data may be performed by a server database at the IoT core, such as server database 260 of FIG. 2. In other embodiments, the parsing may be performed by a processor within a server at the IoT core and configured to place the information in a server database.

As discussed above, the plurality of received data may include aggregated model metadata. At operation 306, the aggregated model metadata is parsed to identify metadata types representing the state of a production ML model deployed at the IoT computing edge device. The aggregated model metadata may be parsed to identify various types of data identifying the production model implemented at the IoT computing edge device, including but not limited to the types of metadata discussed with respect to FIG. 2. In various embodiments, the aggregated model metadata may be encoded, and parsing the aggregated model metadata may include decoding the aggregated model metadata. The parsing of the aggregated model metadata may be performed by the same IoT core component that performs the parsing at operation 304 in some embodiments.

At operation 308, performance of the deployed production model is analyzed. The analysis at operation 308 can be similar to the analysis performed by the production model performance analyzer 214 discussed above with respect to FIG. 2. That is, operation 308 may utilize the identified metadata types to recreate the state of a version of the production model running at the IoT computing edge device at a given time and analyze the model's performance in that state. In various embodiments, the sensor data parsed from the received plurality of data at operation 304 can be used to analyze the performance of the recreated model. In various embodiments, operation 308 may include a number of specific types of analyses known in the art to predict various metrics, such as classification, regression, or other types of predictive analytics known in the art.

At operation 310, pattern recognition is applied onto deployed model production model performance metrics to identify a pattern associated with concept drift based on the results of the various analyses of the deployed production model at operation 308. As discussed above, although concept drift is conceptually understood as occurring in IoT environments, prior solutions fail to consider the associated impact on model performance in determining how to train predictive models. At operation 310, the IoT core is capable of identifying one or more patterns within the results of recreated production model analyses that illustrates the particular impact of concept or data drift in terms of ML model performance metrics within the IoT edge. The pattern recognition at operation 310 may be similar to the pattern recognition discussed above with respect to the production model performance analyzer 214 of FIG. 2.

At operation 312, the impact of concept drift (as illustrated by patterns recognized through pattern recognition of the recreated model results at operation 310) is used to determine how to continually train machine learning models. By considering how concept drift is actually impacting the deployed production model's performance, embodiments in accordance with the present disclosure facilitates more efficient training for and mitigation of concept drift within the IoT environment, allowing for more precise and faster updating of machine learning models running at IoT computing edge devices. In various embodiments, a data expert at the IoT core may determine how to train models based on the impact of concept drift determined at operation 310. In other embodiments, the IoT core may automatically make a determination of how best to train models based on the determined impact. An IoT core component, such as concurrent model training controller 218 discussed with respect to FIG. 2, may be used to make the determination of how to use the determined impact in various embodiments, either automatically or through an interface with a data expert.

One or more training approaches are determined at operation 312, in view of the impact of the concept drift on the deployed production model. The one or more training approaches may include, but not limited to, the types of training approaches discussed with respect to concurrent model training controller 218 of FIG. 2.

At operation 314, the one or more training approaches are used to perform model training. The results of the model training may be output to a training model performance comparator, such as training model performance comparator 222 discussed with respect to FIG. 2. The results may include performance statistics from a variety of different data analytic algorithms in various embodiments. In some embodiments, the result of model training may not be output to a separate training model performance comparator, but comparison of the results may be performed by the same IoT core component that performs the model training at operation 314. In various embodiments, the one or more machine learning models produced through the model training may be output to a model repository configured to store the various models for future use, whether through deployment to the IoT computing edge device or for other comparative actions.

At operation 316, the results of the production model performance of operation 308 and the results of training model performance resulting from operation 314 are compared to determine the best predictive model. In various embodiments, the determination of the best predictive model may be based on customer requirements for a model's performance, similar to the comparison requirements discussed above with respect to FIG. 2.

At operation 318, the best predictive model to address the impact of concept drift is deployed to the IoT computing edge device. In various embodiments, the deployment is performed by an updating engine, such as model updater 224 discussed with respect to FIG. 2. In various embodiments, the selected predictive model may deployed to the IoT computing edge device over the same network over which the IoT computing edge device communicated the plurality of data. Which model is deployed may also be maintained at the IoT core for use in continuous model training, like the model training discussed with respect to operations 312 and 314. A time-stamped version of the deployed model may be stored in a memory at the IoT core for use in such training in various embodiments.

Figure 4:
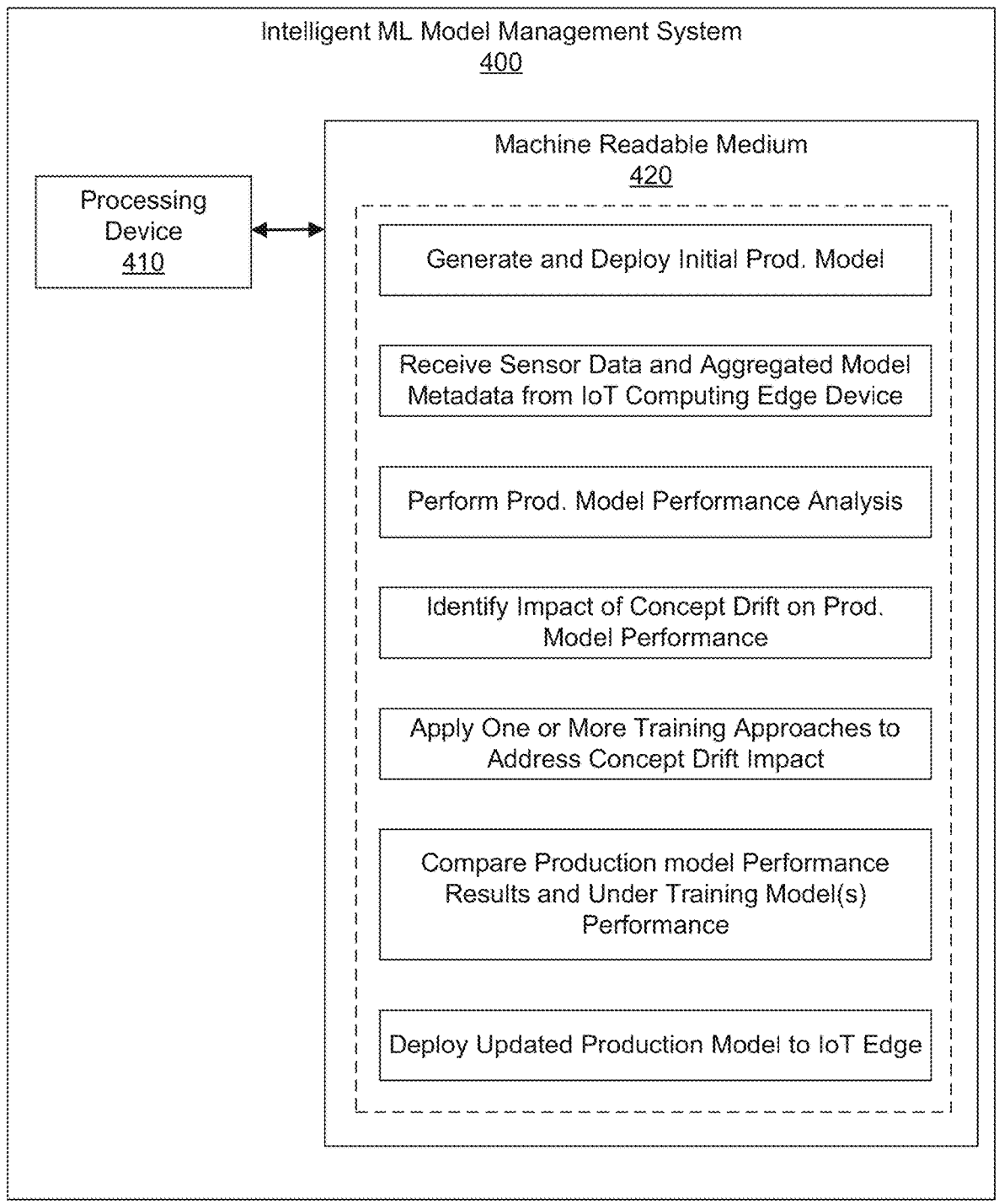
FIG. 4 illustrates an example intelligent ML model management system in accordance with various embodiments of the technology disclosed herein.

FIG. 4 illustrates an example intelligent ML model management system 400 in accordance with various embodiments of the technology disclosed herein. In various embodiments, the intelligent ML model management system 400 may be an IoT core, similar to the IoT core discussed with respect to FIGS. 1-3. Intelligent ML model management system 400 includes a processing device 410. In various embodiments, processing device 410 may be one or more processors within a server at an IoT core. In other embodiments, processing device 410 may be one or more processors within one or more servers at an IoT core.

Processing device 410 is configured to execute instructions stored on a machine readable medium 420. Machine readable medium 420 may be one or more types of computer storage mediums. Non-limiting examples include: flash memory; solid state storage (SSD) devices; storage area network (SAN); removable memory (e.g., memory stick, CD, SD cards, etc.); or internal computer RAM or ROM; among other types of computer storage mediums. The instructions stored on the machine readable medium 420 may include various sub-instructions for performing the function embodied by the identified functions. For example, the instruction "Generate and Deploy Initial Prod. Model" may comprise sub-instructions known in the art to generate an initial production model, such as selecting a training data set and comparing the resulting trained models against requirements for a deployed production model. The instruction "Receive Sensor Data and Aggregated Model Metadata from IoT Computing Edge Device" may include sub-instructions to perform actions discussed with respect to server database 260 and operation 304 of FIGS. 2 and 3, respectively. The instruction "Perform Prod. Model Performance Analysis" may include sub-instructions to perform the actions of metadata subscriber processor 212 and production model performance analyzer 214, and operations 306 and 308, discussed with respect to FIGS. 2 and 3, respectively. The instruction "Identify Impact of Concept Drift on Prod. Model Performance" may include sub-instructions for performing the pattern recognition aspect of production model performance analyzer 214, and operation 310, discussed with respect to FIGS. 2 and 3, respectively. The instruction "Apply One or More Training Approaches to Address Concept Drift Impact" may include sub-instructions for performing the actions of concurrent model training controller 218, analytics framework 220, and training model performance comparator 222, and operations 312 and 314, discussed with respect to FIGS. 2 and 3, respectively. The instruction "Compare Production Model Performance Results and Under Training Model(s) Performance" may include sub-instructions to perform the actions of model performance comparator 216 and operation 316 discussed with respect to FIGS. 2 and 3, respectively. The instruction "Deploy Updated Production Model to IoT Edge" may include sub-instructions to perform the actions of model updater 224 and operation 318 discussed with respect to FIGS. 2 and 3, respectively. Machine readable medium 420 may include additional instructions to perform other functions in various embodiments.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 5:
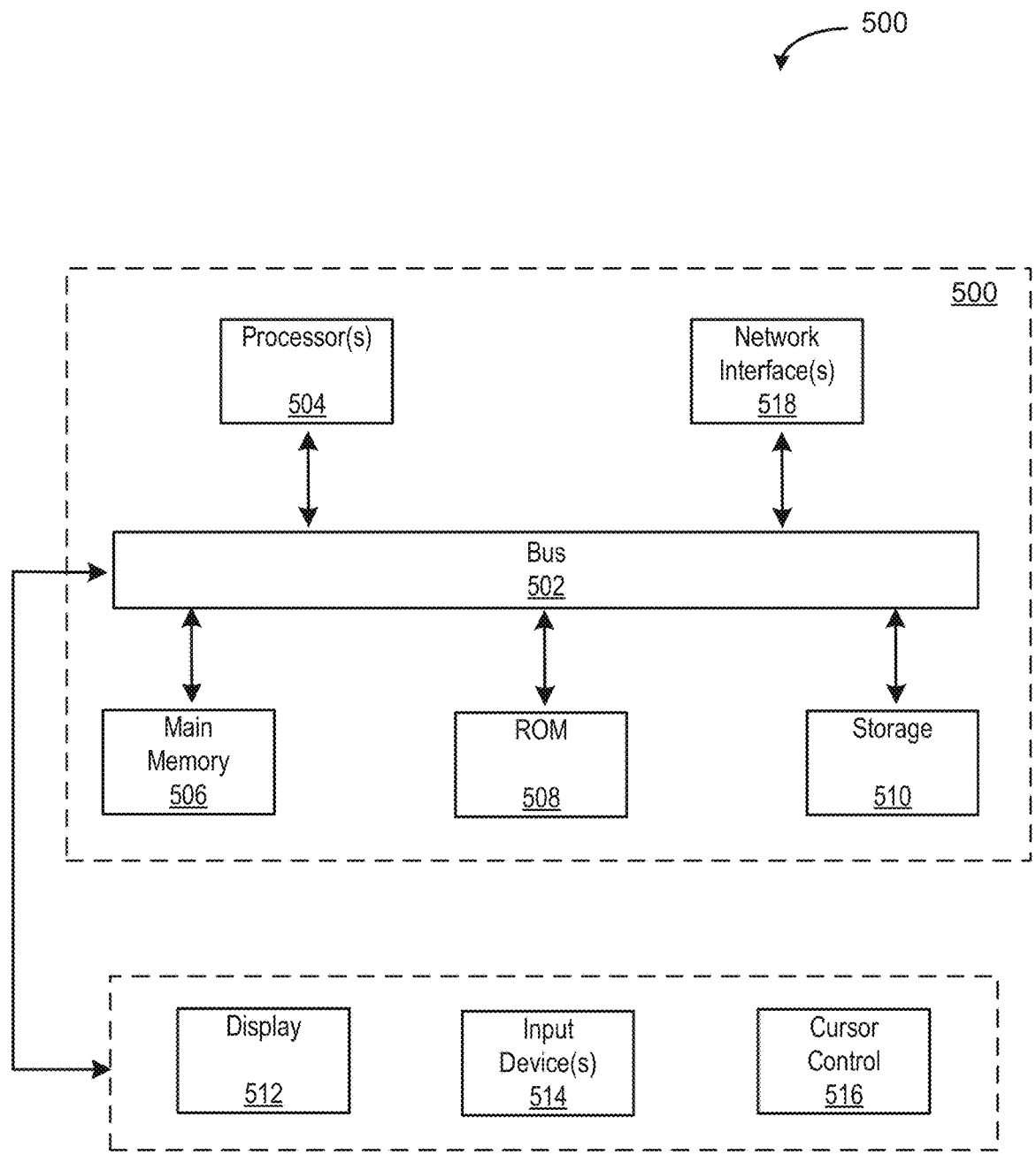
FIG. 5 is an example computing component that may be used to implement various features of embodiments described in the present disclosure.

FIG. 5 depicts a block diagram of an example computer system 500 in which various embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicate with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An Internet-of-Things (IoT) core, comprising:
a production model performance analyzer configured to analyze the performance of a deployed production model;
a concurrent model training controller configured to select one or more machine learning training approaches;
a model performance comparator configured to compare a performance of the deployed production model as determined by the production model performance analyzer and the performance of one or more trained machine learning models by the concurrent model training controller; and
a model updater configured to deploy a selected machine learning model;
wherein the concurrent model training controller is configured to select the one or more machine learning training approaches based on one or more recognized patterns in the performance of the deployed production model indicative of one or more types of impact of concept drift.

2. The IoT core of claim 1, further comprising a server database communicatively coupled to the production model performance analyzer and the concurrent model training controller.

3. The IoT core of claim 1, the production model performance analyzer including a data expert interface configured to enable a data expert to view results of one or more analyses performed by the production model performance analyzer and provide one or more inputs to the production mode performance analyzer.

4. The IoT core of claim 1, the concurrent model training controller including a data expert interface configured to enable a data expert to view the one or more machine learning training approaches and provide one or more inputs to the concurrent model training controller.

5. The IoT core of claim 1, wherein the production model performance analyzer includes a production model pattern assessment component configured to identify one or more patterns within one or more results of the production model performance analyzer indicative of one or more types of concept drift.

6. The IoT core of claim 1, further comprising a metadata subscribing processor configured to parse a received aggregate model metadata to identify one or more model metadata types representative of the deployed production model.

7. The IoT core of claim 6, wherein the metadata subscribing processor and the production model performance analyzer is a single component.

8. The IoT core of claim 1, the model updater further configured to communicate the deployed selected machine learning model in a model repository.

9. The IoT core of claim 1, wherein the production model performance analyzer is configured to receive a plurality of model metadata types and a plurality of sensor data from one or more IoT edge computing devices communicatively connected over a network.

10. The IoT core of claim 1, wherein the one or more machine learning training approaches comprises: continual training; new data training; custom training; and user controlled data.

11. The IoT core of claim 1, wherein the concurrent model training controller selects the one or more machine learning training approaches based on the one or more types of concept drift indicated by the one or more patterns recognized by the production model performance analyzer.

* * * * *